US010938867B2

(12) United States Patent
Deole et al.

(10) Patent No.: US 10,938,867 B2
(45) Date of Patent: Mar. 2, 2021

(54) AUTOMATIC ON HOLD COMMUNICATION SESSION STATE MANAGEMENT IN A CONTACT CENTER

(71) Applicant: Avaya Inc., Santa Clara, CA (US)

(72) Inventors: Pushkar Yashavant Deole, Pune (IN); Sandesh Chopdekar, Pune (IN)

(73) Assignee: Avaya Inc., Santa Clara, CA (US)

( * ) Notice: Subject to any disclaimer, the term of this patent is extended or adjusted under 35 U.S.C. 154(b) by 134 days.

(21) Appl. No.: 16/208,076

(22) Filed: Dec. 3, 2018

(65) Prior Publication Data

US 2020/0177646 A1 Jun. 4, 2020

(51) Int. Cl.
*H04L 29/06* (2006.01)
*G06N 20/00* (2019.01)

(52) U.S. Cl.
CPC ...... *H04L 65/1096* (2013.01); *H04L 65/1083* (2013.01); *H04L 65/4015* (2013.01); *G06N 20/00* (2019.01)

(58) Field of Classification Search
CPC ............ H04L 65/1083; H04L 65/1096; H04L 65/4015; H04L 12/1827; H04L 47/74; H04L 47/76; H04L 65/1046; H04L 67/38; G06N 20/00; H04M 3/42
See application file for complete search history.

(56) References Cited

U.S. PATENT DOCUMENTS

| 4,858,120 A * | 8/1989 | Samuelson | G06Q 10/06 705/7.25 |
| 5,006,983 A * | 4/1991 | Wayne | G06Q 10/06 705/7.13 |
| 5,696,809 A * | 12/1997 | Voit | H04M 3/2254 379/22.01 |
| 5,946,388 A * | 8/1999 | Walker | H04M 3/523 379/265.02 |
| 6,597,779 B1 * | 7/2003 | Wilk | H04M 3/428 379/162 |
| 6,628,777 B1 * | 9/2003 | McIllwaine | G06Q 10/06 379/265.01 |
| 6,834,101 B1 * | 12/2004 | Pershan | H04M 3/424 379/207.04 |
| 6,947,988 B1 * | 9/2005 | Saleh | H04M 3/5175 379/133 |
| 7,228,281 B1 * | 6/2007 | Ney | G06Q 10/103 705/301 |
| 7,349,534 B2 * | 3/2008 | Joseph | H04M 3/5166 379/265.01 |

(Continued)

*Primary Examiner* — Kostas J Katsikis
(74) *Attorney, Agent, or Firm* — Sheridan Ross P.C.

(57) ABSTRACT

A real-time communication session is monitored to determine if the real-time communication session has been placed on hold. For example, a contact center agent may place a real-time video communication session with a customer on hold. In response to determining that the real-time communication session has been placed on hold: a maximum hold time is determined for the real-time communication session and the real-time communication session is monitored to determine if the maximum hold time has expired while the real-time communication is placed on hold. In response to determining that maximum hold time has expired while the real-time communication session is placed on hold, the real-time communication session is automatically taken off hold.

20 Claims, 4 Drawing Sheets

(56) References Cited

U.S. PATENT DOCUMENTS

| | | | | |
|---|---|---|---|---|
| 8,233,611 B1* | 7/2012 | Zettner | H04M 3/5231 | 379/210.01 |
| 8,428,246 B2* | 4/2013 | Venugopal | H04M 3/523 | 379/266.01 |
| 8,781,092 B2* | 7/2014 | Noble, Jr. | H04M 3/5231 | 379/209.01 |
| 9,055,140 B2* | 6/2015 | Strandberg | H04M 3/00 | |
| 9,191,508 B1* | 11/2015 | Mekonnen | H04M 3/428 | |
| 9,247,059 B1* | 1/2016 | Chidambaram | H04M 3/5166 | |
| 10,129,396 B1* | 11/2018 | Desai | H04M 3/5166 | |
| 10,674,011 B1* | 6/2020 | Ouimette | H04M 3/42195 | |
| 2002/0076031 A1* | 6/2002 | Falcon | H04M 3/5125 | 379/265.11 |
| 2004/0202308 A1* | 10/2004 | Baggenstoss | H04M 3/5175 | 379/265.06 |
| 2004/0202309 A1* | 10/2004 | Baggenstoss | H04M 3/5238 | 379/265.06 |
| 2005/0066008 A1* | 3/2005 | Sikora | G06Q 10/10 | 709/206 |
| 2005/0125249 A1* | 6/2005 | Takubo | G06Q 40/00 | 705/35 |
| 2005/0152531 A1* | 7/2005 | Hamilton, II | H04M 3/4285 | 379/266.01 |
| 2005/0175971 A1* | 8/2005 | McIlwaine | G06Q 10/109 | 434/219 |
| 2006/0233346 A1* | 10/2006 | McIlwaine | H04M 3/5238 | 379/265.02 |
| 2006/0256949 A1* | 11/2006 | Noble, Jr. | H04M 3/5231 | 379/265.01 |
| 2007/0172050 A1* | 7/2007 | Weinstein | H04M 3/5166 | 379/266.07 |
| 2007/0287430 A1* | 12/2007 | Hosain | H04M 11/002 | 455/414.1 |
| 2008/0008309 A1* | 1/2008 | Dezonno | H04M 3/5232 | 379/265.02 |
| 2008/0126219 A1* | 5/2008 | Hengel | G06Q 30/0617 | 705/26.43 |
| 2009/0122972 A1* | 5/2009 | Kaufman | H04M 3/5125 | 379/265.12 |
| 2009/0249083 A1* | 10/2009 | Forlenza | G06F 21/6209 | 713/193 |
| 2010/0057607 A1* | 3/2010 | Galit | G06Q 20/04 | 705/37 |
| 2010/0172487 A1* | 7/2010 | Segall | H04M 3/51 | 379/266.01 |
| 2010/0172488 A1* | 7/2010 | Segall | H04M 3/51 | 379/266.07 |
| 2011/0123005 A1* | 5/2011 | Segall | H04M 3/5183 | 379/88.13 |
| 2011/0123016 A1* | 5/2011 | Segall | G06Q 30/02 | 379/266.07 |
| 2011/0129081 A1* | 6/2011 | Segall | H04M 3/5158 | 379/266.07 |
| 2011/0238544 A1* | 9/2011 | Segall | G06Q 20/102 | 705/34 |
| 2011/0246308 A1* | 10/2011 | Segall | G06Q 10/109 | 705/14.66 |
| 2011/0280391 A1* | 11/2011 | Venugopal | H04M 3/523 | 379/266.1 |
| 2012/0087486 A1* | 4/2012 | Guerrero | G06Q 10/06311 | 379/265.02 |
| 2012/0150719 A1* | 6/2012 | Galit | H01R 13/506 | 705/37 |
| 2012/0224680 A1* | 9/2012 | Spottiswoode | H04M 3/5232 | 379/265.12 |
| 2012/0281825 A1* | 11/2012 | Segall | H04M 3/5141 | 379/265.1 |
| 2012/0288082 A1* | 11/2012 | Segall | H04M 3/5158 | 379/266.07 |
| 2012/0300917 A1* | 11/2012 | Commarford | H04M 3/4285 | 379/207.03 |
| 2013/0013359 A1* | 1/2013 | Kohler | G06Q 10/0631 | 705/7.13 |
| 2013/0202102 A1* | 8/2013 | Jaiswal | H04M 3/5232 | 379/266.01 |
| 2014/0016766 A1* | 1/2014 | Strandberg | H04M 3/523 | 379/265.09 |
| 2014/0278600 A1* | 9/2014 | Puthiyottil | G06Q 30/08 | 705/5 |
| 2015/0111521 A1* | 4/2015 | Brenton | H04W 4/029 | 455/404.1 |
| 2015/0281435 A1* | 10/2015 | Charlson | H04M 3/5158 | 379/142.06 |
| 2015/0348151 A1* | 12/2015 | Francis | G06Q 30/0611 | 705/26.4 |
| 2017/0111507 A1* | 4/2017 | McGann | G06N 5/04 | |
| 2017/0316438 A1* | 11/2017 | Konig | G06Q 30/016 | |
| 2017/0374197 A1* | 12/2017 | Rumpf | H04M 3/5125 | |
| 2018/0013891 A1* | 1/2018 | Charlson | H04M 3/42221 | |
| 2018/0261238 A1* | 9/2018 | Togawa | G10L 25/51 | |
| 2018/0309801 A1* | 10/2018 | Rathod | H04L 67/141 | |
| 2020/0177646 A1* | 6/2020 | Deole | H04L 65/1096 | |

* cited by examiner

AUTOMATIC ON HOLD COMMUNICATION SESSION STATE MANAGEMENT IN A CONTACT CENTER

FIELD

The disclosure relates generally to contact centers and particularly to communication session hold state management in a contact center.

BACKGROUND

One issue for a contact center is where a customer is placed on hold for a long period of time. For example, the customer may be initially placed on hold in a contact center queue and then connected to a contact center agent. While the customer and the contact center agent are on the call, the contact center agent may need to also place the customer on hold. For example, the contact center agent may need to consult with a supervisor or retrieve a document. At times, the customer may be kept on hold for an extended period of time and does not understand why it is taking so long. The time period of keeping the call on hold is at the contact center agent's discretion. It doesn't take too long for the customer to get frustrated when the on hold time gets extended beyond a certain limit. Many times this leads to a dissatisfied customer who abandons the call. This impacts the call center performance since the statistic of number of abandoned calls increases.

SUMMARY

These and other needs are addressed by the various embodiments and configurations of the present disclosure. A real-time communication session is monitored to determine if the real-time communication session has been placed on hold. For example, a contact center agent may place a real-time video communication session with a customer on hold. In response to determining that the real-time communication session has been placed on hold: a maximum hold time is determined for the real-time communication session and the real-time communication session is monitored to determine if the maximum hold time has expired while the real-time communication is placed on hold. In response to determining that maximum hold time has expired while the real-time communication session is placed on hold, the real-time communication session is automatically taken off hold.

The technology disclosed herein reduces the number of abandoned real-time communication sessions while the customer is put 'on hold' during a conversation by a contact center agent, which results in an overall improvement in the call center. In addition, the system dictates the hold time instead of the contact center agent and gives a clear indication to the contact center agent that someone is waiting for the information at the other end of the real-time communication session. This results in an overall reduction in the on hold time of the contact center since the system dictates the on hold time instead of the contact center agent and thus improves the contact center agent's performance and automatically results in improved workforce optimization.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
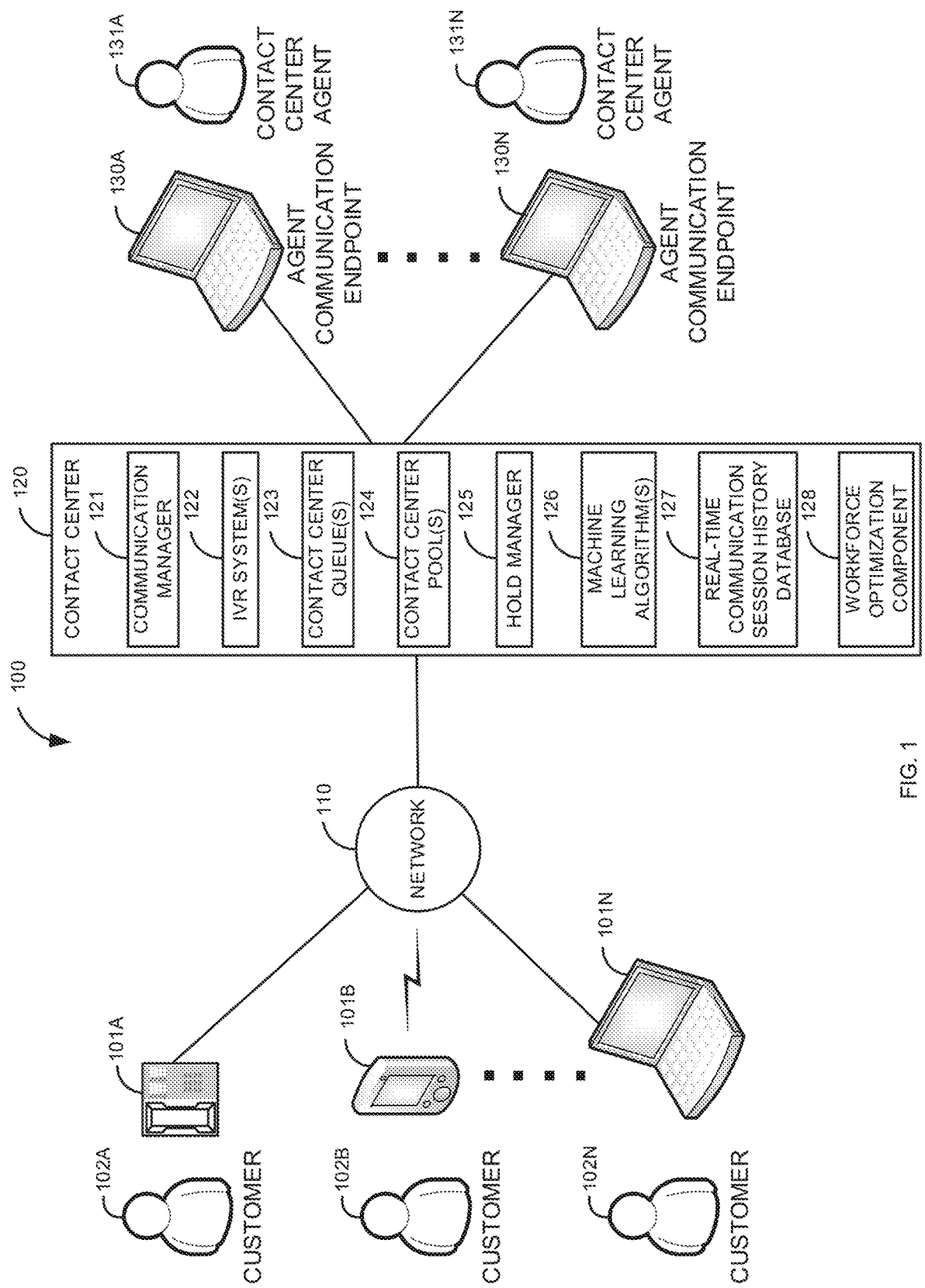
FIG. 1 is a block diagram of a first illustrative system for managing a real-time communication session hold state in a contact center.

FIG. 1 is a block diagram of a first illustrative system 100 for managing a real-time communication session hold state in a contact center 120. The first illustrative system 100 comprises customer communication endpoints 101A-101N, a network 110, a contact center 120, and agent communication endpoints 130A-130N. In addition, corresponding customers 102A-102N are shown at the customer communication endpoints 101A-101N. Likewise, corresponding contact center agents 131A-131N are shown at the agent communication endpoints 130A-130N.

The customer communication endpoints 101A-101N can be or may include any user communication endpoint device that can communicate on the network 110, such as a Personal Computer (PC), a telephone, a video system, a cellular telephone, a Personal Digital Assistant (PDA), a tablet device, a notebook device, a voice conferencing system, a video conferencing system, a smartphone, and/or the like. The customer communication endpoints 101A-101N are devices where a communication sessions ends. The communication endpoints 101A-101N are not network elements that facilitate and/or relay a communication session in the network 110, such as a communication manager 121 or router. As shown in FIG. 1, any number of customer communication endpoints 101A-101N may be connected to the network 110.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), video protocols, Instant Messaging (IM) protocols, and/or the like. Thus, the network 110 is an electronic communication network configured to carry messages via packets and/or circuit switched communications.

The contact center 120 can be or may include any hardware coupled with firmware/software that can manage and route real-time communication sessions. The contact center 120 further comprises a communication manager 121, Interactive Voice Response (IVR) system(s) 122, contact center queue(s) 123, contact center pool(s) 124, a hold manager 125, machine learning algorithm(s) 126, a real-time communication session history database 127, and a workforce optimization component 128.

The communication manager 121 can be or may include any hardware coupled with firmware/software that can manage and route real-time communication sessions in the contact center 120. The real-time communication sessions may include voice, video, virtual reality, multimedia, Instant Messaging (i.e., a real-time chat session), and/or the like. The communication manager 121 can route real-time communication sessions (i.e., incoming and/or outgoing) between the customer communication endpoints 101A-101N and the IVR system(s) 122, the contact center queue(s) 123, the contact center pool(s) 124, the agent communication endpoints 130A-130N and/or the like.

The IVR system(s) 122 can be or may include any hardware coupled with firmware/software that can provide voice interaction with a customer 102. The IVR system(s) 122 may also support video.

The contact center queue(s) 123 can be or may include any computer construct that can hold communication sessions (e.g., real-time communication sessions) for routing to the agent communication endpoints 130A-130N or other devices (e.g., a chat bot or IVR system 122). The contact center queue(s) 123 may support different types of communication sessions, such as, voice, video, virtual reality, multimedia, IM, chat, and/or the like.

The contact center pool(s) 124 can be or may include any computer construct that can hold real-time communication sessions for routing to the agent communication endpoints 130A-130N or other devices. The contact center pool(s) 124 hold the communication sessions until selection by a contact center agent 131.

The hold manager 125 can be or may include any software that can manage a hold state for a real-time communication session. The hold manager 125 can manage the hold state for various types of real-time communication sessions, such as, voice, video, virtual reality, multimedia, IM, chat, and/or the like.

The machine learning algorithm(s) 126 can be or may include any software that can automatically be used to determine a maximum hold time by running analytics of prior history/histories and/or current real-time communications with the customer 102 (e.g., 102A) and/or other customers 102 (e.g., 102B-102N). The machine learning algorithm(s) 126 can be or may include one or more learning algorithm(s) 126, such as, a linear regression algorithm, a logistic regression algorithm, a decision tree algorithm, a Naïve Bayes algorithm, a K-means algorithm, a Random Forrest algorithm, a gradient boosting algorithm and/or the like.

The real-time communication history database 127 can be or may include any database that can store a history of events, analytics, and/or information associated with one or more real-time communication sessions. The real-time communication history database 127 can be any type of database, such as a relational database, a file system, a file, an object-oriented database, and/or the like.

The workforce optimization component 128 can be or may include any software that can be used to manage how resources (e.g., IVR system(s) 122, contact center queue(s) 123, contact center pool(s) 124, contact center agents 131A-131N, etc.) are used in the contact center 120. The responsibility of workforce optimization component 128 is to analyze the data about where exactly most of the contact center agent's time is being spent during an interaction and then provide a report where the optimization can be done.

The agent communication endpoints 130A-130N can be or may include any user communication device, such as the customer communication endpoint 101. An agent communication endpoint 130 may comprise multiple agent communication endpoints 130, such as a telephone and a personal computer.

Figure 2:
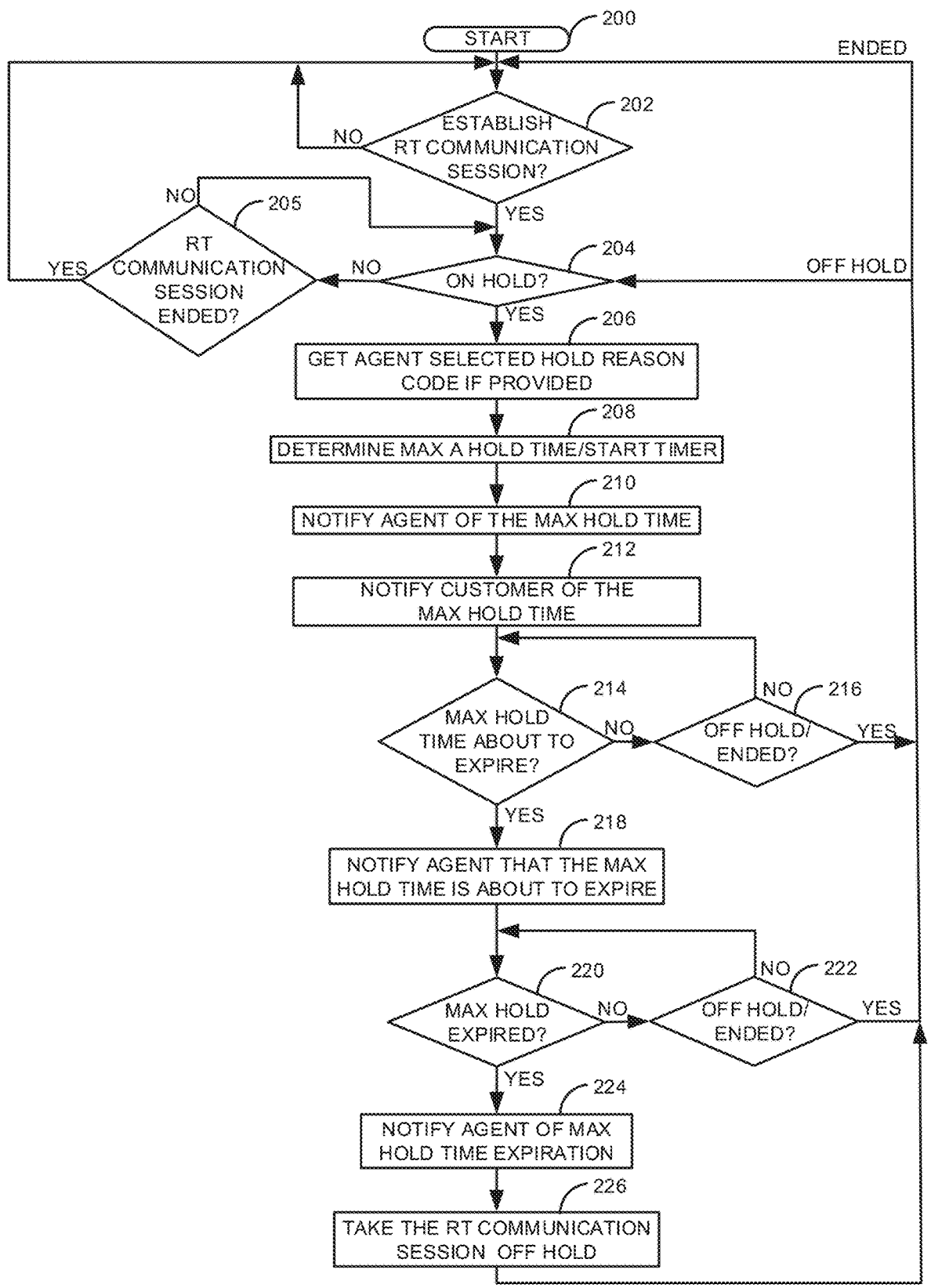
FIG. 2 is a flow diagram of a process for managing a real-time communication session hold state in a contact center.
Figure 3:
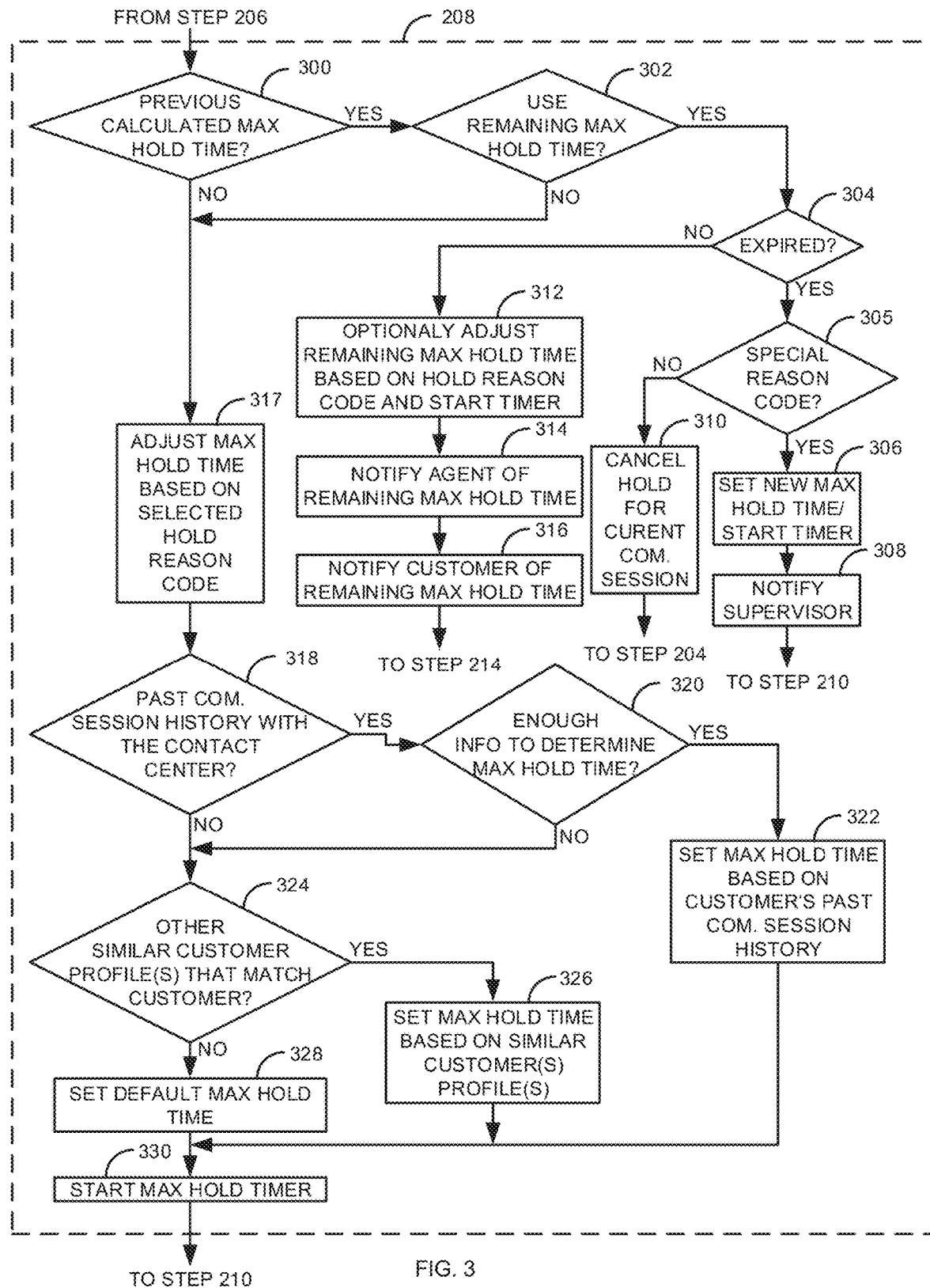
FIG. 3 is a flow diagram of a process for determining a maximum hold time for a real-time communication session.

FIG. 2 is a flow diagram of a process for managing a real-time communication session hold state in a contact center 120. Illustratively, the customer communication endpoints 101A-101N, the contact center 120, the communication manager 121, the IVR system(s) 122, the contact center queue(s) 123, the contact center pool(s) 124, the hold manager 125, the machine learning algorithm(s) 126, the real-time communication session history database 127, and the agent communication endpoints 130A-130N are stored-program-controlled entities, such as a computer or microprocessor, which performs the methods of FIGS. 2-3 and the processes described herein by executing program instructions stored in a computer readable storage medium, such as a memory (i.e., a computer memory, a hard disk, and/or the like). Although the methods described in FIGS. 2-3 are shown in a specific order, one of skill in the art would recognize that the steps in FIGS. 2-3 may be implemented in different orders and/or be implemented in a multi-threaded environment. Moreover, various steps may be omitted or added based on implementation.

The process starts in step 200. The communication manager 121 waits, in step 202, to see if a real-time communication session (e.g., voice, video, virtual reality, multimedia, IM, chat, and/or the like) has been established. For example, a real-time voice communication session may be established between a customer communication endpoint 101 and an agent communication endpoint 130. If a real-time communication session is not established in step 202, the process of step 202 repeats.

Otherwise, if the real-time communication session has been established in step 202, the hold manager 125 determines, in step 204, if the real-time communication session has been placed on hold. For example, a contact center agent 131 may place the voice communication session with a customer 102 on hold. If the real-time communication session has not been placed on hold in step 204, the communication manager 121 determines, in step 205, if the real-time communication session has been ended. If the real-time communication session has ended in step 205, the process goes to step 202. Otherwise, if the real-time communication session has not ended in step 205, the process goes back to step 204 to see if the real-time communication session has been placed on hold.

If the real-time communication session has been placed on hold in step 204, the hold manager 125 gets an agent selected hold reason code(s) (if provided) in step 206. The contact center agent 131 may be able to select (e.g., from a menu or list provided in a graphical user interface) one or more reasons for placing the customer 102 on hold. For example, the selected hold reason code may be for searching through on-line documentation, consulting another contact center agent 131, consulting a supervisor, looking for information in a database, retrieving a document, sending an email, and/or the like.

The hold manager 125 determines, in step 208, a maximum hold time. The maximum hold time is the maximum amount of time that the customer 102 will be allowed to be placed on hold by the contact center agent 131. The maximum hold time may be determined in various ways, such as, based on the selected hold reason code, based on the customer's previous communication session history, based one or more other customer's prior communication history where the other customer's profiles closely/partially match that of the customer's profile (e.g., language, age, geography, etc.), based on a default maximum hold time, and/or the like (e.g., as described in further detail in FIG. 3). The machine learning algorithm 126 may be used to determine the maximum hold time based on information/analytics stored in the real-time communication history database 127. The hold manager 125 also starts a timer to count down the maximum hold time in step 208.

The hold manager 125 notifies the contact center agent 131 of the maximum hold time in step 210. For example, a pop-up window may be displayed in the agent communication endpoint 130 and/or an audio whisper mode (that only the contact center agent 131 can hear) may be used to play the maximum hold time to the contact center agent 131.

The customer 102 is notified of the maximum hold time in step 212. For example, the customer 102 may be sent a text message in an IM session, played a voice message by the IVR system 122, displayed a video message, and/or the like. The message indicates the maximum amount of time that the real-time communication session will be placed on hold.

The hold manager 125 determines, in step 214, if the maximum hold time is about to expire. For example, if there are ten seconds until the maximum hold time expires. If the maximum hold time is not about to expire in step 214, the hold manager 125 determines, in step 216, if the real-time communication session has been taken off hold or ended. If the real-time communication session has not been taken off hold or ended in step 216, the process goes back to step 214. Otherwise, if the real-time communication session has been taken off hold or ended in step 216, the process goes back to step 204 if the real-time communication session has been taken off hold or to step 202 if the real-time communication session has ended.

If the maximum hold time is about to expire in step 214, the hold manager 125 notifies the contact center agent 131 that the maximum hold time is about to expire in step 218. For example, the hold manager 125 may cause a pop-up window or use a whisper mode to notify the contact center agent 131 that the maximum hold time is about to expire. The hold manager 125 determines, in step 220, if the maximum hold time has expired. If the maximum hold time has not expired in step 220, the hold manager 125 determines, in step 222, if the real-time communication session has been taken off hold or ended. If the real-time communication session has been taken off hold or ended in step 222, the process goes back to step 204 if the real-time communication session has been taken off hold or to step 202 if the real-time communication session has ended. Otherwise, if the real-time communication session has not been taken off hold in step 222, the process goes back to step 220.

If the maximum hold time has expired in step 220, the hold manager 125 notifies, in step 224, the contact center agent 131 that the maximum hold time has expired and that the real-time communication session will be taken off hold. For example, a pop-up or whisper mode may be used to notify the contact center agent 131 in step 224. The customer 102 may also be notified that the real-time communication session is being taken off hold in step 224. The real-time communication session is taken off hold in step 226 and the process goes back to step 204.

FIG. 3 is a flow diagram of a process for determining a maximum hold time for a real-time communication session. FIG. 3 is an exemplary embodiment of step 208 of FIG. 2. After getting the agent selected hold reason code in step 206, the hold manager 125 determines, in step 300, if a previous maximum hold time was calculated for the real-time communication session. For example, if the real-time communication session is being placed on hold one or more additional times, there would have been a previously calculated maximum hold time for the real-time communication session. If there was a previously calculated maximum hold time for the real-time communication session in step 300, the hold manager 125 determines, in step 302, whether the remaining maximum hold time (what portion is left) will be used instead of recalculating a new maximum hold time. If a new maximum hold time is to be calculated in step 302, the process goes to step 317.

Otherwise, if the remaining maximum hold time for the real-time communication session is to be used, the hold manager 125 determines, in step 304, if the maximum hold time has already expired (i.e., as in step 220 of FIG. 2). If the maximum hold time has already expired in step 304, the hold manager 125, determines, in step 305, if the contact center agent 131 entered a special reason code. The special reason code allows some additional hold time to be added to the maximum hold time. In one embodiment, there may be multiple special reason codes that can be selected where different amounts of time are added to the maximum hold time. If the special reason code has been selected in step 305, the hold manager 125 sets the new maximum hold time and starts the maximum hold time timer in step 306. A supervisor is then notified (or it may be logged in a database) in step 308. In addition, the reason code may be provided to the workforce optimization component 128. The workforce optimization component 128 may record the data and perform analytics to suggest where exactly the time was spent and where optimization of the workforce (i.e., contact center agents 131) may be done. The process then goes to step 210 where the agent is notified of the new maximum hold time.

Otherwise, if a special reason code has not been entered in step 310, the hold state for the current real-time communication session is denied (i.e., the contact center agent 131 can no longer put the current real-time communication session on hold) in step 310. The process then goes to step 204.

If the maximum hold time for the real-time communication session has not expired in step 304, the hold manager 125 optionally adjusts the remaining maximum hold time based on the selected hold reason code in step 312. For example, if the initial maximum hold time (when the real-time communication session was first placed on hold) was calculated based on a hold reason code of where the contact center agent 131 retrieves a document (where a short maximum hold time is calculated), the hold manager 125 may add some additional time to the maximum hold time based on a different selected hold reason code for when the real-time communication session is placed on hold a second time (e.g., where the supervisor is consulted). Alternatively, the remaining time may be shortened based on the new reason code requiring less time. The hold manager 125 also starts the maximum hold timer in step 312. The contact center agent 131 is notified of the remaining maximum hold time in step 314. The customer 102 is notified of the remaining maximum hold time in step 316. The process then goes to step 214 where it is determined if the maximum hold time is about to expire.

If there was not a previously calculated maximum hold time in step 300, the hold manager 125 adjusts the maximum hold time based on the selected hold reason code (of step 206). The selected hold reason code may be used to add or remove additional time to the calculated maximum hold time. Alternatively, the selected hold reason code may be used as one of the variables used in determining the maximum hold time (i.e., in steps 322, 326, and 328).

The hold manager 125 determines, in step 318, if the customer 102 has had previous real-time communications (or other types of communication session e.g., email)). This information may be stored in the real-time communication session history database 127. For example, the real-time communication session history database 127 may contain information and analytics, such as, the customer's name, the customer's address, demographics associated with the customer 102 (e.g., age, income, likes, dislikes, etc.), how many times the customer 102 was put on hold in any prior real-time communication session(s), how long the customer 102 was put on hold in the prior real-time communication session(s), a time for each of the real-time communication sessions that the customer 102 was put on hold, how long did the customer 102 have to wait in the real-time communication sessions in a center queue 123/contact center pool 124 before the real-time communications were assigned to a contact center agent 131, a customer feedback for real-time communication sessions where the customer 102 was put on hold (e.g., satisfactory/dissatisfactory). how many times the customer 102 abandoned a real-time communication session and the time period before abandonment (e.g., an average abandonment time), how many times the customer 102 was about to abandon a real-time communication session while on hold (e.g., based on customer feedback), what kind of real-time communication sessions were made by the customer 102 in the past (e.g., whether they were general queries (low priority) or important calls (high priority)), for the current real-time communication session, how long the customer 102 has been waiting in a contact center queue 123/contact center pool 124 before the real-time communication session was sent to a contact center agent 131, a sentiment analysis of the customer 102 before the current real-time communication session is placed on hold, a type of customer 102 (e.g., a priority customer 102 or lower priority customer 102), and/or the like.

If the customer 102 has had a past communication session history in step 318, the hold manager 125/machine learning algorithm 126 determines, in step 320, if there is enough information to determine the maximum hold time. For example, if the customer 102 has only established a voice communication session that was never placed on hold, the hold manager 125 will likely determine that there is not enough information in step 320. Alternatively, if the customer 102 has abandoned five out of ten prior voice calls where the customer 102 was on hold over two minutes, the hold manager 125 can determine that the maximum hold time should be less than two minutes. If there is enough information to determine the maximum hold time in step 320, the hold manager 125/machine learning algorithm 126 sets the maximum hold time based on the customer's past communication session history in step 322. The hold manager 125 then starts the hold timer in step 330 and the process goes to step 210.

If there is not enough information to determine the maximum hold time in step 320 or there is not a past communication session history with the contact center 120 in step 318, the hold manager 125/machine learning algorithm 126 determines, in step 324, if there are other customer profile(s) that are similar to the customer's profile. For example, another customer profile may have similar demographics (e.g., located in the same area, have similar interests, have similar likes, dislikes, purchase similar products, similar age, similar gender or other personal characteristics, etc.). If there are one or more similar customer profiles in step 324, the hold manager 125/machine learning algorithm 126 uses recent information/analytics about other real-time communication sessions that were abandoned while on hold by other customers 102. The hold manager 125/machine learning algorithm 126 compares the recent real-time communication interaction profiles to come up with the maximum hold time; the maximum hold time can be computed by taking an average of multiple different profiles obtained about the recent real-time communication sessions. The maximum hold time is set in step 326, the timer for the max hold time is started in step 330, and the process goes to step 210.

If there are no other customer profiles that match the customer's profile in step 324, a default maximum hold time is used in step 328. The default maximum hold time may be an administered hold time. The default maximum hold time in step 328 may be administered differently based on the selected hold reason code. The maximum hold timer is then stated in step 330 and the process goes to step 210.

In one embodiment, the maximum hold time may use the selected hold time reason code, the past communication session history of the customer 102, the past communication session history of other customers 102 (the customer profiles), and/or the default max hold time to calculate the maximum hold time. For example, the maximum hold time may be computed by using the past communication session history/analytics about the customer 102 (which is 4 minutes), the past communication session history/analytics of other customers 102 of closely matching profiles (which is 3 minutes), and the default maximum hold time configured in the system by administrator for the selected hold time reason code (which is 2 minutes). In this example the hold manager 125 applies the machine learning algorithm 126 to arrive at a maximum hold time which may be somewhere in between 2-4 minutes.

Figure 4:
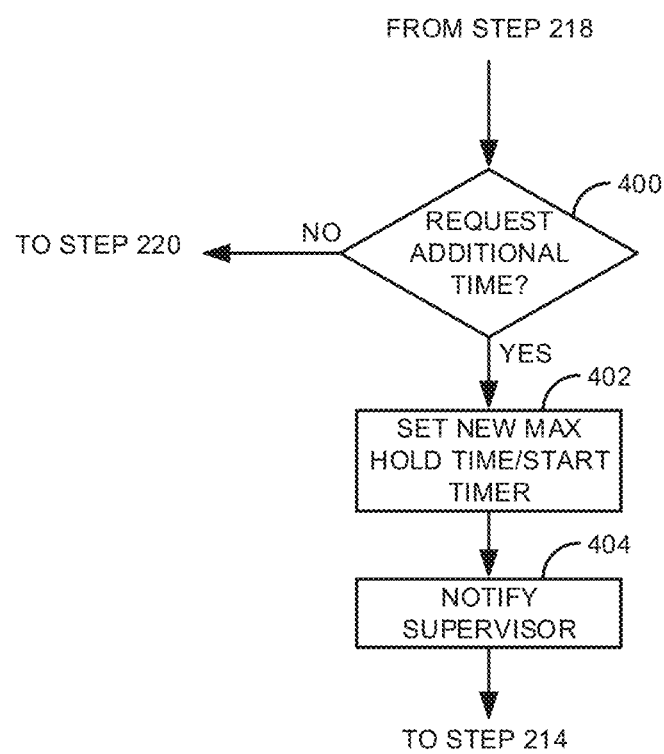
FIG. 4 is a flow diagram of a process for allowing a contact center agent to request additional hold time.

FIG. 4 is a flow diagram of a process for allowing a contact center agent 131 to request additional hold time. The process of FIG. 4 may optionally go between steps 218 and 220 of FIG. 2. After the contact center agent 131 is notified that the maximum hold time is about to expire in step 218, the contact center agent 131 may request additional hold time before the maximum hold time expires in step 400. If the contact center agent 131 does not request additional hold time in step 400, the process goes to step 220.

Otherwise, if the contact center agent 131 has requested additional hold time (e.g., by selecting a special reason code similar to step 305), the hold manager 125 sets a new maximum hold time and starts the timer in step 402. A supervisor is then notified in step 404. By notifying the supervisor in step 404 the supervisor may join the real-time communication session to query the contact center agent 131 about the extra requested hold time or to provide assistance to the contact center agent if necessary. The process then goes to step 214.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIV1926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network 110, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
   a microprocessor; and
   a computer readable medium, coupled with the microprocessor and comprising microprocessor readable and executable instructions that, when executed by the microprocessor, cause the microprocessor to:
   monitor a real-time communication session to determine if the real-time communication session has been placed on a first hold; and
   in response to determining that the real-time communication session has been placed on the first hold:
   determine a first maximum hold time for the real-time communication session;
   determine that the first maximum hold time is about to expire;

send a message to notify a contact center agent that the first maximum hold time is about to expire;

monitor the real-time communication session to determine if the first maximum hold time has expired while the real-time communication session is placed on the first hold; and in response to determining that the first maximum hold time has expired while the real-time communication session is placed on the first hold, automatically taking the real-time communication session off the first hold.

2. The system of claim 1, wherein the microprocessor readable and executable instructions cause the microprocessor to:

in response to determining that the first maximum hold time did not expire while the real-time communication session was placed on the first hold, identify a remaining first maximum hold time;

monitor the real-time communication session to determine if the real-time communication session has been placed on a second hold; and in response to determining that the real-time communication session has been placed on the second hold:

monitor the real-time communication session to determine if the remaining first maximum hold time has expired while the real-time communication session is placed on the second hold; and in response to determining that the remaining first maximum hold time has expired while the real-time communication session is placed on the second hold, automatically taking the real-time communication session off the second hold.

3. The system of claim 1, wherein the microprocessor readable and executable instructions cause the microprocessor to:

determine a selected hold reason code, wherein the selected hold reason code is selected based on a reason the real-time communication session was placed on the first hold and wherein the selected hold reason code is used to determine the first maximum hold time for the real-time communication session.

4. The system of claim 1, wherein the real-time communication session is between a customer communication endpoint and an agent communication endpoint and wherein determining the first maximum hold time is based on at least one of: a real-time communication session history of a first customer, a customer profile of a second customer, and a default maximum hold time.

5. The system of claim 4, wherein the first maximum hold time is determined based on the real-time communication session history of the first customer and at least one of the following customer attributes:

how many previous times the first customer was put on hold in the real-time communication session;

how long the first customer was previously put on hold in the real-time communication session;

a number of times the first customer was put on hold in previous real-time communication sessions;

a time period that the first customer waited in a contact center queue or contact center pool before the real-time communication session was assigned to a contact center agent;

a customer feedback for the previous real-time communication sessions for which the first customer was put on hold;

how many times the first customer abandoned the previous real-time communication sessions;

an average abandonment time for the previous real-time communication sessions;

a type of the real-time communication session;

a sentiment analysis of the first customer before the real-time communication session is put on the first hold; and a type of the first customer.

6. The system of claim 1, wherein the real-time communication session is between a first customer communication endpoint and an agent communication endpoint and wherein the microprocessor readable and executable instructions cause the microprocessor to at least one of:

send a message to the first customer communication endpoint that states that the real-time communication session will be on hold no longer than the first maximum hold time; and send a message to the agent communication endpoint that states that the real-time communication session will only be on hold no longer than the first maximum hold time.

7. The system of claim 1, wherein the microprocessor readable and executable instructions cause the microprocessor to:

determine a selected hold reason code, wherein the selected hold reason code is a special reason code that allows a contact center agent to place the real-time communication session on a second hold for a second maximum hold time or to extend the first maximum hold time.

8. The system of claim 7, wherein the microprocessor readable and executable instructions cause the microprocessor to: send a message to at least one of a contact center supervisor and a workforce optimization component, wherein the message indicates that the contact center agent has placed the real-time communication session on the second hold using the special reason code.

9. A method comprising:

monitoring, by a microprocessor, a real-time communication session between a first customer communication endpoint and an agent communication endpoint;

determining if the real-time communication session has been placed on a first hold, wherein the first hold is initiated by the agent communication endpoint; and in response to determining that the real-time communication session has been placed on the first hold:

determining, by the microprocessor, a first maximum hold time for the real-time communication session;

monitoring, by the microprocessor, the real-time communication session to determine if the first maximum hold time has expired while the real-time communication session is placed on the first hold; and in response to determining that the first maximum hold time has expired while the real-time communication session is placed on the first hold, automatically taking, by the microprocessor, the real-time communication session off the first hold.

10. The method of claim 9, further comprising:

determining a selected hold reason code, wherein the selected hold reason code is selected based on a reason the real-time communication session was placed on the first hold and wherein the selected hold reason code is used to determine the first maximum hold time for the real-time communication session.

11. A method comprising:
monitoring, by a microprocessor, a real-time communication session to determine if the real-time communication session has been placed on a first hold; and
in response to determining that the real-time communication session has been placed on the first hold:
determining, by the microprocessor, a selected hold reason code and determining a first maximum hold time for the real-time communication session based on the selected hold reason code.

12. The method of claim 11, further comprising:
identifying a remaining first maximum hold time in response to determining that the first maximum hold time did not expire while the real-time communication session was placed on the first hold;
monitoring the real-time communication session to determine if the real-time communication session has been placed on a second hold; and
in response to determining that the real-time communication session has been placed on the second hold:
monitoring the real-time communication session to determine if the remaining first maximum hold time has expired while the real-time communication session is placed on the second hold; and
in response to determining that the remaining first maximum hold time has expired while the real-time communication session is placed on the second hold, automatically taking the real-time communication session off the second hold.

13. The method of claim 11, further comprising:
monitoring the real-time communication session to determine if the first maximum hold time has expired while the real-time communication session is placed on the first hold; and
in response to determining that first maximum hold time has expired while the real-time communication session is placed on the first hold, automatically taking, by the microprocessor, the real-time communication session off the first hold.

14. The method of claim 11, wherein the real-time communication session is between a customer communication endpoint and an agent communication endpoint and wherein determining the first maximum hold time is further based on at least one of: a real-time communication session history of a first customer, a customer profile of a second customer, and a default maximum hold time.

15. The method of claim 14, wherein the first maximum hold time is based on the real-time communication session history of the first customer, the customer profile of the second customer, and the default maximum hold time.

16. The method of claim 14, wherein the first maximum hold time is determined based on the real-time communication session history of the first customer and at least one of the following customer attributes:
how many previous times the first customer was put on hold in the real-time communication session;
how long the first customer was previously put on hold in the real-time communication session;
a number of times the first customer was put on hold in previous real-time communication sessions;
a time period that the first customer waited in a contact center queue or contact center pool before the real-time communication session was assigned to a contact center agent;
a customer feedback for the previous real-time communication sessions for which the first customer was put on hold;
how many times the first customer abandoned the previous real-time communication sessions;
an average abandonment time for the previous real-time communication sessions;
a type of the real-time communication session;
a sentiment analysis of the first customer before the real-time communication session is put on the first hold; and
a type of the first customer.

17. The method of claim 11, wherein the real-time communication session is between a first customer communication endpoint and an agent communication endpoint and further comprising at least one of:
sending a message to the first customer communication endpoint that states that the real-time communication session will be on hold no longer than the first maximum hold time; and
sending a message to the agent communication endpoint that states that the real-time communication session will only be on hold no longer than the first maximum hold time.

18. The method of claim 11, further comprising:
determining that the first maximum hold time is about to expire; and
sending a message to notify a contact center agent that the first maximum hold time is about to expire.

19. The method of claim 11,
wherein the selected hold reason code is a special reason code that allows a contact center agent to place the real-time communication session on a second hold for a second maximum hold time or to extend the first maximum hold time.

20. The method of claim 19, further comprising: sending a message to at least one of a contact center supervisor and a workforce optimization component, wherein the message indicates that the contact center agent has placed the real-time communication session on the second hold using the special reason code.

* * * * *